United States Patent
Yao et al.

(10) Patent No.: US 8,503,672 B2
(45) Date of Patent: Aug. 6, 2013

(54) METHOD AND APPARATUS FOR PROTECTING CONTENT CONSUMER'S PRIVACY

(75) Inventors: Jun Yao, Suwon-si (KR); Choong-hoon Lee, Seoul (KR); Su-hyun Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 731 days.

(21) Appl. No.: 12/111,424

(22) Filed: Apr. 29, 2008

(65) Prior Publication Data

US 2009/0067622 A1    Mar. 12, 2009

(30) Foreign Application Priority Data

Sep. 6, 2007 (KR) .................. 10-2007-0090578

(51) Int. Cl.
*H04L 29/06*    (2006.01)
(52) U.S. Cl.
USPC ............ 380/44; 380/279; 713/162; 713/163; 713/165; 713/167; 726/29

(58) Field of Classification Search
USPC . 726/28–30; 713/162, 163, 165–167; 380/44, 380/262, 279, 284, 286
See application file for complete search history.

(56) References Cited

U.S. PATENT DOCUMENTS

| | | | |
|---|---|---|---|
| 7,359,517 B1 * | 4/2008 | Rowe | 380/284 |
| 2004/0151308 A1 * | 8/2004 | Kacker et al. | 380/30 |
| 2007/0198424 A1 * | 8/2007 | Yamamoto et al. | 705/57 |
| 2007/0265966 A1 * | 11/2007 | Kahn et al. | 705/51 |

\* cited by examiner

*Primary Examiner* — Justin T Darrow
(74) *Attorney, Agent, or Firm* — Sughrue Mion, PLLC

(57) ABSTRACT

Provided is a method of protecting a content consumer's privacy. The method includes classifying contents into content groups, encrypting the contents using different encryption keys, generating a plurality of decryption keys each of which can decrypt all contents in each of the content groups, and provides the generated decryption keys to authorized clients, wherein each client is provided with a different decryption key.

7 Claims, 5 Drawing Sheets

| IMAGE QUALITY LEVEL \ CATEGORY | A<br>TV Program | B<br>Movie | C<br>Game |
|---|---|---|---|
| HIGH | $K_{A,a,1} \ldots K_{A,a,n}$ | $K_{B,a,1} \ldots K_{B,a,n}$ | $K_{C,a,1} \ldots K_{C,a,n}$ |
| MIDDLE | $K_{A,b,1} \ldots K_{A,b,n}$ | $K_{B,b,1} \ldots K_{B,b,n}$ | $K_{C,b,1} \ldots K_{C,b,n}$ |
| LOW | $K_{A,c,1} \ldots K_{A,c,n}$ | $K_{B,c,1} \ldots K_{B,c,n}$ | $K_{C,c,1} \ldots K_{C,c,n}$ |

METHOD AND APPARATUS FOR PROTECTING CONTENT CONSUMER'S PRIVACY

CROSS-REFERENCE TO RELATED PATENT APPLICATION

This application claims priority from Korean Patent Application No. 10-2007-0090578, filed on Sep. 6, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to providing contents stored in a server to clients, and more particularly, to providing contents in such a manner as to protect content consumers' privacy.

2. Description of the Related Art

The widespread development of broadband networks and affordable computing devices promotes the penetration of digital contents into every aspect of daily life. The demand for these digital multimedia contents, such as television (TV) programs, films, and music, increases tremendously with improvements in quality and access.

Unlike traditional analog contents which suffer from quality degradation when copied, digital contents can be perfectly duplicated and then easily disseminated. Accordingly, piracy, which is the use of contents without a content provider's permission, often takes place. In order to prevent such piracy, much research has been done on digital rights management (DRM).

In general, a content server provides contents to clients based on DRM. That is, if a client attempting to use a specific item of content passes authentication, the content server, which encrypts and manages contents, provides the corresponding encrypted content to the authorized client along with a decryption key. The authentication may be performed by the content server or by a separate authentication server.

In the DRM field, efforts so far have been concentrated on prevention of access by unauthorized users, and traditional content distribution approaches have not seriously considered consumer privacy issues. That is, all consumption records are exposed to a content provider when a consumer provides his or her authentication information to the content provider. Accordingly, the content provider can determine what content has been used by the consumer, thereby failing to protect the consumer's privacy.

Also, when content encrypted with a predetermined encryption key is sold to a plurality of consumers, and one of the consumers distributes a decryption key without a content provider's permission, the perpetrator cannot be traced.

SUMMARY OF THE INVENTION

The present invention provides a method and apparatus for encrypting contents and providing the encrypted contents to a plurality of clients so that a server cannot determine what contents have been used by clients.

The present invention also provides a method and apparatus for managing contents so that, if leakage of a decryption key occurs, a client who has leaked the decryption key can be traced.

According to an aspect of the present invention, there is provided a method of providing predetermined contents stored in a content server to clients, the method comprising: encrypting the contents by using different encryption keys; generating a plurality of decryption keys each of which can decrypt all the encrypted contents; and providing the generated decryption keys to clients who are authorized to access the contents, wherein each client is provided with a different decryption key.

The method may further comprise classifying the contents stored in the content server into a plurality of content groups; wherein the predetermined contents are included in one of the content groups.

The method may further comprise providing the encrypted contents to arbitrary clients irrespective of whether the arbitrary clients are authorized to access the contents.

The classifying of the contents may comprise classifying the contents according to a content price, a user's age, or a content category.

According to another aspect of the present invention, there is provided a computer-readable recording medium having embodied thereon a computer program for executing the method.

According to another aspect of the present invention, there is provided a server apparatus for providing predetermined contents to clients, the server apparatus comprising: an encrypting unit which encrypts the contents by using different encryption keys; a key generating unit which generates a plurality of decryption keys each of which can decrypt all the encrypted contents; and a key providing unit which provides the generated decryption keys to clients who are authorized to access the contents, wherein the each client is provided with a different decryption key.

The server apparatus may further comprise a content classifying unit which classifies the contents stored in the server apparatus into a plurality of content groups, wherein the predetermined contents are included in one of the content groups.

The server apparatus may further comprise a content providing unit which provides the encrypted contents to arbitrary clients irrespective of whether the arbitrary clients are authorized to access the contents.

The content classifying unit may classify the contents according to a content price, a user's age, or a content category.

BRIEF DESCRIPTION OF THE DRAWINGS

The above and other aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

Certain exemplary embodiments of the present invention will now be described more fully with reference to the accompanying drawings. Although the terms "client" and "user" are used in the following detailed description of the exemplary embodiments, the two terms are synonymous with each other because both refer to "content consumers".

Figures 1, 2:
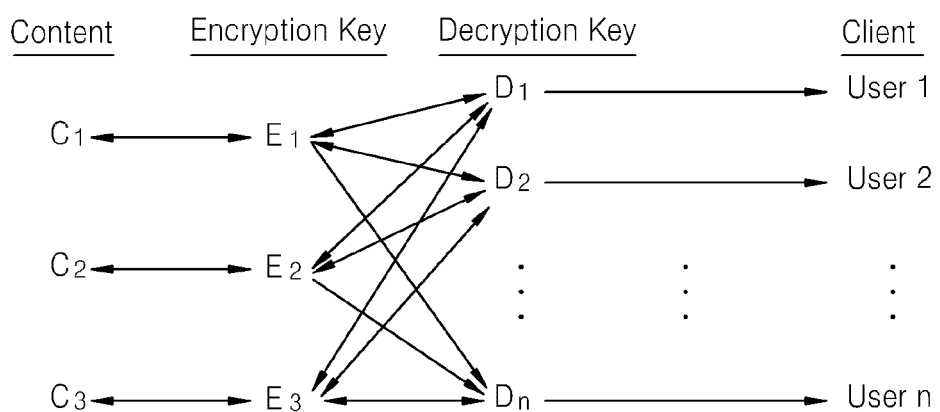
FIG. 1 is a table illustrating encryption keys of contents grouped and managed by a server according to an exemplary embodiment of the present invention.
FIG. 2 illustrates relationships between contents in one content group, encryption keys, decryption keys, and clients.

FIG. 1 is a table illustrating encryption keys of contents grouped and managed by a content server according to an exemplary embodiment of the present invention.

The content server groups and manages contents stored therein according to a predetermined standard. The standard may be a content price, a user's age, a content category, or the like.

In FIG. 1, the contents are divided according to an image quality level and a content category, and the content price may vary according to the image quality level.

Referring to FIG. 1, the contents stored in the content server are categorized into "TV program", "movie", and "game". The categorized contents are also classified into "high", "middle", and "low" quality levels. That is, the content server of FIG. 1 classifies the contents into nine content groups and manages the nine content groups.

The content server of FIG. 1 encrypts all the contents by using different encryption keys. For example, when it is assumed that n contents are included in the "high" and "TV program" content group, the n contents are encrypted using $K_{A,a,1}$ to $K_{A,a,n}$. Since the n contents are respectively encrypted using different encryption keys, if an encryption algorithm for one content is compromised or hacked, the other contents can be protected, thereby ensuring high security.

FIG. 2 illustrates relationships between contents in one content group, encryption keys, decryption keys, and clients for explaining an encryption method according to an embodiment of the present invention.

Contents $C_1$, $C_2$, and $C_3$ are included in one content group, and are respectively encrypted using encryption keys $E_1$, $E_2$, and $E_3$. The encryption keys $E_1$, $E_2$, and $E_3$ are different from one another as described above. For reference, the encrypted contents $C_1$, $C_2$, and $C_3$ of FIG. 2 are freely distributed to arbitrary clients without specific authentication, and decryption keys are provided to only authorized users (clients) through safe channels.

When it is assumed that the number of authorized clients is n, n decryption keys are generated. That is, decryption keys $D_1$, $D_2$, through to $D_n$ are generated.

Each of the decryption keys of FIG. 2 can decrypt all the contents $C_1$, $C_2$, and $C_3$ included in the one content group. That is, the decryption key $D_1$ can decrypt all the encrypted contents $C_1$, $C_2$, and $C_3$ and each of the decryption keys $D_2$, $D_3$, through to $D_n$ can also decrypt all the encrypted contents $C_1$, $C_2$, and $C_3$. There are many mathematical algorithms for generating the encryption keys $E_1$, $E_2$, and $E_3$ and the decryption keys $D_1$, $D_2$, through to $D_n$. One such algorithm will be explained later with reference to FIGS. 5A and 5B.

The decryption keys $D_2$, $D_3$, through to $D_n$ are respectively distributed to authorized users without overlapping. That is, the decryption key $D_1$ is provided to a user 1, and the decryption key $D_2$ is provided to a user 2. Accordingly, according to the present embodiment, two or more users cannot have the same decryption key.

Since the encrypted contents $E_1$, $E_2$, and $E_3$ are distributed to arbitrary clients without authentication as described above, the content server cannot determine who has downloaded what content. That is, any client can freely download the encrypted contents $E_1$, $E_2$, and $E_3$ without authentication such as having to log in.

Accordingly, the user 1 can obtain the encrypted content $C_2$ from the content server, or through other paths. Once the user 2 obtains the decryption key $D_2$ through authentication, the user 2 can freely use the contents $C_1$, $C_2$, and $C_3$ included in the same content group. Accordingly, the content server can recognize the fact that the user 2 has obtained a decryption key but cannot determine what content the user 2 has used among the contents $C_1$, $C_2$, and $C_3$, thereby making it possible to protect the user 2's privacy.

Also, since the n users have different decryption keys, if leakage of a decryption key occurs, a user who has leaked the decryption key to others can be traced. For example, if the decryption key $D_1$ is shared on the Internet without permission, it can be judged that the user 1 has leaked the decryption key $D_1$.

Figure 3:
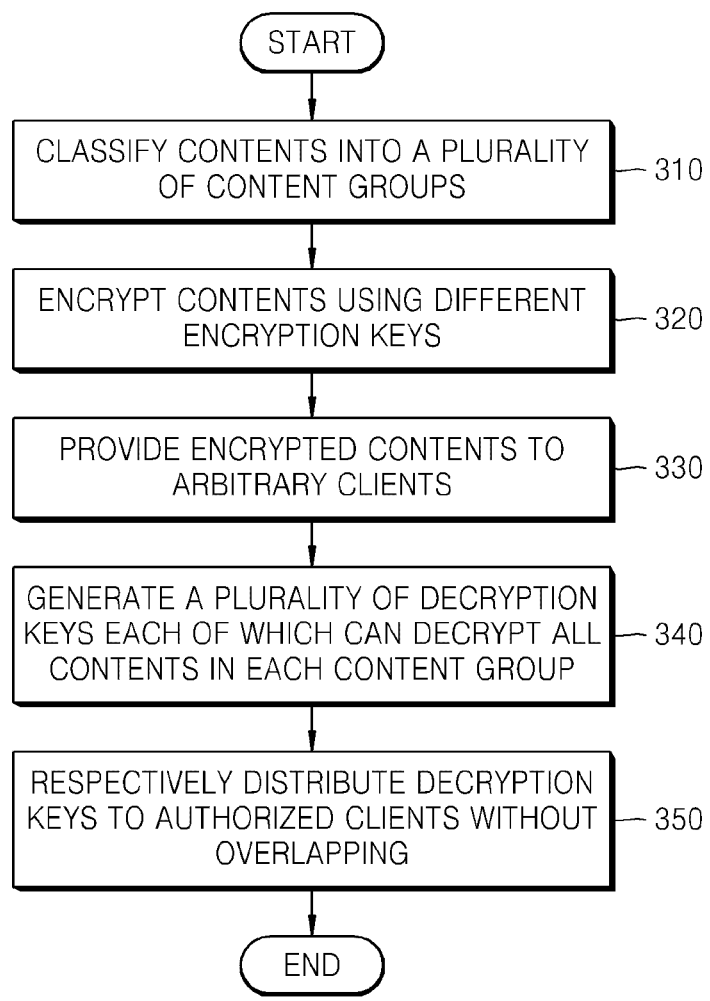
FIG. 3 is a flowchart illustrating a method of providing contents stored in a server to a plurality of clients according to an exemplary embodiment of the present invention.

FIG. 3 is a flowchart illustrating a method of providing contents stored in a server to a plurality of clients according to an exemplary embodiment of the present invention.

In operation 310, the server classifies the contents into a plurality of content groups according to a predetermined standard. The standard may be a content price, a user's age, a content category, or the like.

In operation 320, the contents are encrypted using different encryption keys.

In operation 330, the encrypted contents are provided to arbitrary clients. That is, irrespective of whether the clients are authorized clients, the encrypted contents are published to all clients so that the clients can freely download the encrypted contents.

In operation 340, decryption keys each of which can decrypt all contents included in each content group are generated. That is, all contents included in a content group can be decrypted using any of those decryption keys. Also, the decryption keys are different from one another as described above.

In operation 350, the decryption keys are respectively distributed to authorized clients without overlapping. Accordingly, the authorized clients have different decryption keys for the encrypted contents included in the same content group. Authentication for determining whether clients are authorized to access the contents, more specifically, the decryption keys, may be performed by an authentication module in the content server, or by a separate authentication server.

Although the encrypted contents are freely distributed to arbitrary clients, since the decryption keys are provided to only authorized clients after authentication, payment can be charged to only the pertinent users. The payment charging may be performed by a charging module in the content server, or by a separate charging server.

Figure 4:
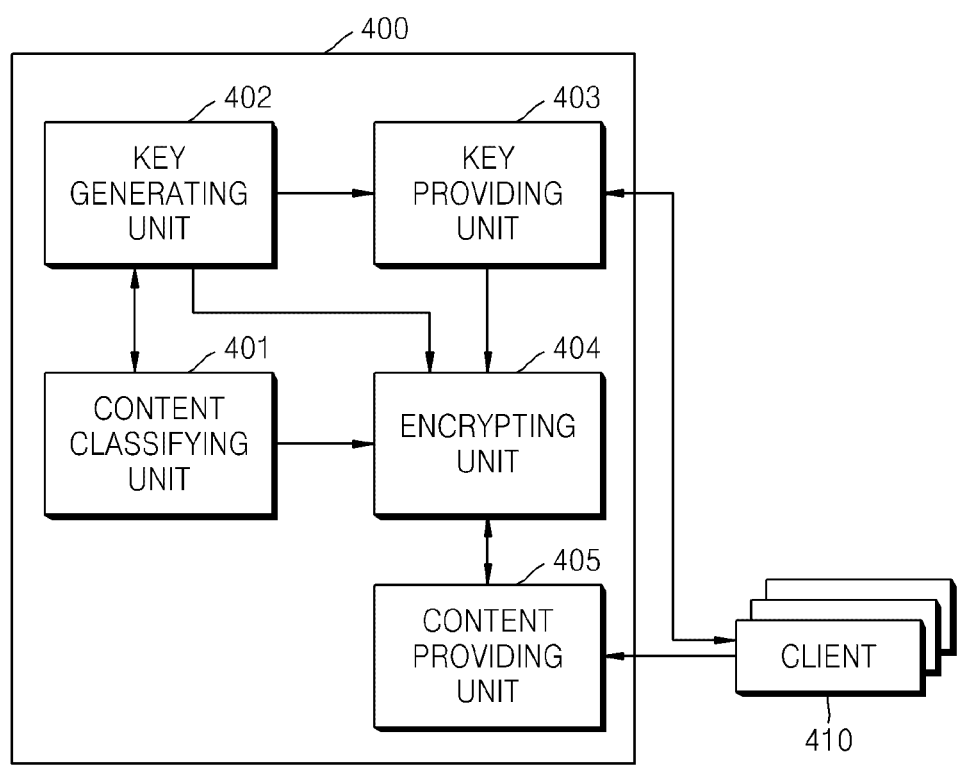
FIG. 4 is a block diagram of a content server according to an exemplary embodiment of the present invention.

FIG. 4 is a block diagram of a content server 400 according to an embodiment of the present invention. Referring to FIG. 4, the content server 400 includes a content classifying unit 401, a key generating unit 402, a key providing unit 403, an encrypting unit 404, and a content providing unit 405.

Although not shown in FIG. 4, a charging module and an authentication module may be further included in the content server 400.

The content classifying unit 401 groups and manages contents stored in the content server 400 according to a predetermined standard. The standard may be a content price, a user's age, a content category, or the like.

The key generating unit 402 generates encryption keys and decryption keys. One encryption key is used for one content, and all the encryption keys are different from one another. A plurality of decryption keys are generated for contents of one content group. All contents in one content group can be decrypted using one decryption key. Also, although decryption keys are generated for contents of the same content group, the decryption keys are different from one another.

The key providing unit 403 provides the decryption keys to authorized clients 410. Since the decryption keys are different from one another, there is no possibility that the same decryption key is distributed to two or more clients.

The encrypting unit 404 encrypts contents using the encryption keys generated by the key generating unit 402.

The content providing unit 405 provides the encrypted contents to arbitrary clients without authentication. That is, irrespective of whether clients are authorized clients, the encrypted contents are freely published so that any client can freely access the encrypted contents.

Figure 5A:
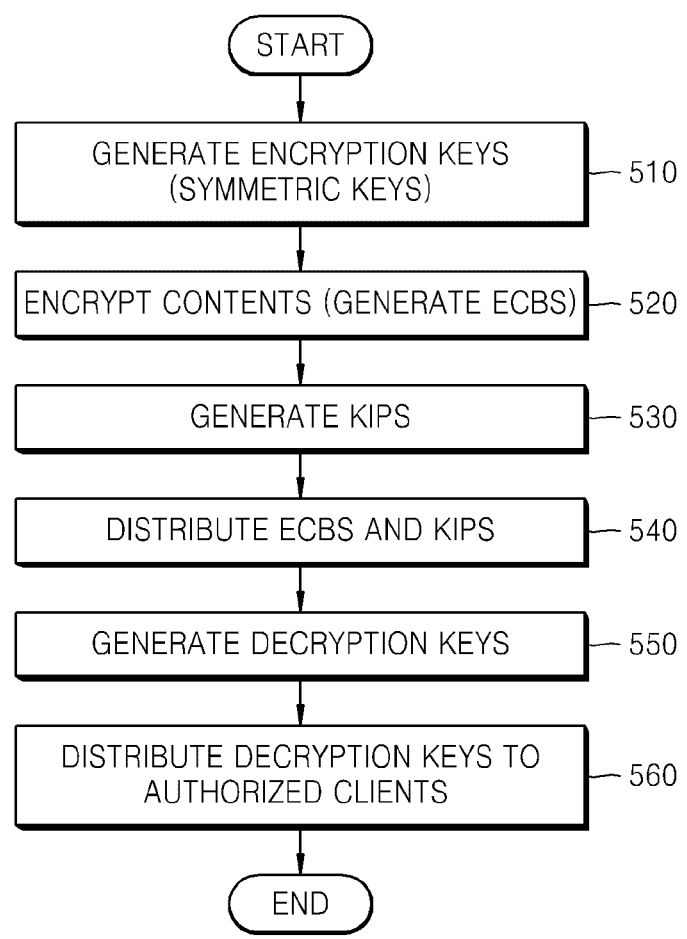
FIG. 5A is a flowchart illustrating a method of encrypting contents, which is performed by a server, according to an exemplary embodiment of the present invention.

FIG. 5A is a flowchart illustrating a method of encrypting contents, which is performed by a content server, according to an embodiment of the present invention. There are many mathematical encryption and decryption algorithms which may be used, and among them, an RSA encryption algorithm is adopted in FIG. 5A, however the present invention is not limited to this encryption algorithm.

In FIG. 5A, the method of encrypting contents is roughly divided into: encrypting contents and generating encrypted content bodies (ECBs); and generating key information parts (KIPs) that can induce encryption keys used in the encryption. The ECBs and KIPs may be provided in one package to users, or may be separately provided through different paths to the users.

In detail, in operation 510, the content server generates encryption keys (symmetric keys).

It is assumed that there are n contents $m_1, m_2$ through to $m_n$ included in the same content group. p and q are selected as large primes and a modular coefficient N=pq. Note that $\phi(N)=(p-1)(q-1)$.

Next, a is defined as a random integer, and n encryption keys $a^{r_1}$ mod N, $a^{r_2}$ mod N, through to $a^{r_n}$ mod N for respectively encrypting the contents $m_1, m_2$ through to $m_n$ are generated. Here, $r_1, r_2$, through to $r_n$ may be generated randomly, and mod denotes a modular operation.

In operation 520, the contents $m_1, m_2$ through to $m_n$ are encrypted using the generated encryption keys $a^{r_1}$ mod N, $a^{r_2}$ mod N, through to $a^{r_n}$ mod N and an encryption function E. Here, the encryption function E may be designed using an existing encryption algorithm, such as an advanced encryption standard (AES), or a data encryption standard (DES), or a combination thereof, or may be a newly designed function. The encryption function E is not limited to a specific one. As a result, n ECBs $c_1, c_2, c_3$, through to $c_n$ are obtained. That is, each ECB may be given by $c_i=E(m_i, k_i)$ where $k_i$ is an $i^{th}$ encryption key.

In operation 530, KIPs are generated.

The random integer e and an integer d satisfying $e \cdot d \equiv 1$ mod $\phi(N)$ are generated according to the RSA algorithm, and key information $a^{r_i e}$ mode N ($1 \leq i \leq n$) for an $i^{th}$ content is generated. Then, a user receiving the decryption key d can calculate any encryption key $a^{r_i}$ ($1 \leq i \leq n$) through $a^{r_i} \equiv (a^{r_i e})^d$ mod N.

However, since all users use the same decryption key d, it is impossible to trace a user who leaks the decryption key d. In order to trace the perpetrator, the algorithm according to the present embodiment is designed as follows.

Two random integers e and k are chosen, and $i^{th}$ key information $a^{r_i e}$ mod N ($1 \leq i \leq n$) and $a^{r_i k}$ mod N ($1 \leq i \leq n$) is generated where the random integers e and k are shared by all the contents $m_1, m_2$ through to $m_n$ included in the same content group.

In operation 540, the content server freely distributes the ECBs and the KIPs to clients without authentication.

In operation 550, decryption keys are generated. Each of the decryption keys is a set of three integers $x_1, y_1$, and $d_1$ satisfying $(x_1 e + y_1 k) d_1 \equiv 1$ mod $\phi(N)$. Since there are an unlimited number of sets satisfying $(x_1 e + y_1 k) d_1 \equiv 1$ mod $\phi(N)$, the decryption key can be generated without being limited by the number of clients. Although the set of three integers $x_1, y_1$, and $d_1$ cannot directly decrypt encrypted contents, since encryption keys for the encrypted contents can be generated using the set of three integers $x_1, y_1$, and $d_1$ so that the encrypted contents can be finally decrypted, the set of three integers $x_1, y_1$, and $d_1$ is referred to as the decryption key.

In operation 560, the set of three integers $x_1, y_1$, and $d_1$, that is, the decryption key, is provided to an authorized client.

Figure 5B:
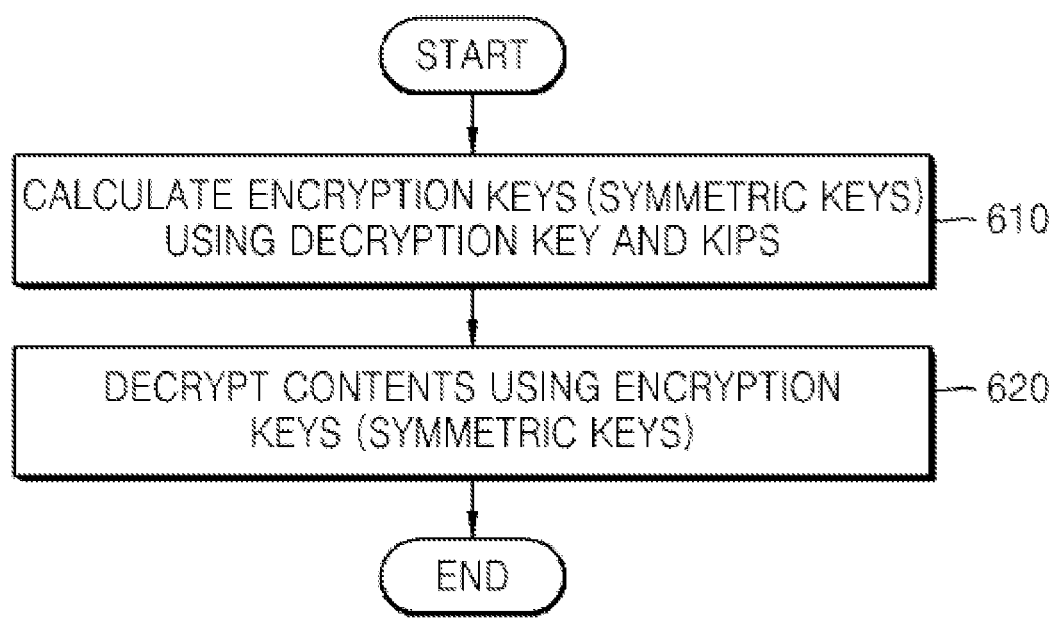
FIG. 5B is a flowchart illustrating a method of decrypting the encrypted contents of FIG. 5A which is performed by a client, according to an exemplary embodiment of the present invention.

FIG. 5B is a flowchart illustrating a method of decrypting the encrypted contents of FIG. 5A, which is performed by a client, according to an embodiment of the present invention.

In operation 610, a user (client) receiving the decryption key generates encryption keys using the decryption key $x_1, y_1$, and $d_1$ and KIPs.

For example, KIPs of a first content are $a^{r_1 e}$ mod N and $a^{r_1 k}$ mod N, and the decryption key is a set of three integers $x_1, y_1$, and $d_1$. Since $(x_1 e + y_1 k) d_1 \equiv 1$ mod $\phi(N)$, an encryption key (symmetric key) for the first content can be $((a^{r_1 e})^{x_1} (a^{r_1 k})^{y_1})^{d_1} \equiv a^{r_1}$ mod N. Accordingly, the client can induce all n encryption keys from the n KIPs by using the one set of three integers $x_1, y_1$, and $d_1$.

In operation 620, the client decrypts the ECBs using the generated encryption keys (symmetric keys). A decryption function D used in the decryption may be designed using existing algorithms or a combination thereof, or may be a newly designed function, like the encryption function E. The decryption function D is not limited to a specific one. As a result, the client can decrypt the contents $m_1, m_2$, through to $m_n$ from the n ECBs $c_1, c_2$, through to $c_n$. That is, $m_i = D(c_i, k_i)$ where $K_i$ is an $i^{th}$ encryption key (symmetric key).

The present invention may be embodied in a general purpose digital computer by running a program from a computer-readable medium. Examples of the computer-readable medium include storage media such as magnetic storage media (e.g., read only memories (ROMs), floppy discs, or hard discs), optically readable media (e.g., compact disk-read only memories (CD-ROMs), or digital versatile disks (DVDs)), and carrier waves (e.g., transmissions over the Internet).

As described above, according to the present invention, since the content server providing contents can recognize the fact that a content consumer has used contents in a certain content group but cannot determine what content has been used by the content consumer, the content consumer's privacy can be protected.

Also, since different decryption keys are distributed to clients, if leakage of a decryption key occurs, a user who has leaked the decryption key can be traced.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing contents, which are stored in a content server, to clients, the method comprising:

classifying the contents stored in the content server into a plurality of content groups;

encrypting contents in a content group using a different encryption key for each separate content of the contents in the content group;

generating, at the content server, a plurality of decryption keys each of which can decrypt all the encrypted separate contents in the content group; and providing the decryption keys to clients which are authorized to access the contents in the content group, wherein each client of the clients is provided with a different decryption key of the decryption keys, and wherein the encrypted contents are included in one of the content groups.

2. The method of claim 1, further comprising providing the encrypted contents to arbitrary clients irrespective of whether the arbitrary clients are authorized to access the contents in the content group.

3. The method of claim 1, wherein the classifying the contents comprises classifying the contents stored in the content server according to a content price, an age of a user, or a content category.

4. A non-transitory computer-readable medium having embodied thereon a computer program for executing the method of claim 1.

5. A server apparatus for providing contents to clients, the server apparatus comprising a computer configured to provide the functions of:

a content classifying unit which classifies the contents stored in the server apparatus into a plurality of content groups;

an encrypting unit which encrypts contents in a content group using a different encryption key for each separate content of the contents in the content group;

a key generating unit which generates a plurality of decryption keys each of which can decrypt all the encrypted separate contents in the content group; and a key providing unit which provides the decryption keys, generated by the key generating unit, to clients which are authorized to access the contents in the content group, wherein each client is provided with a different decryption key of the decryption keys, wherein the encrypted contents are included in one of the content groups.

6. The server apparatus of claim 5, wherein the computer is further configured to provide the functions of a content providing unit which provides the encrypted contents to arbitrary clients irrespective of whether the clients are authorized to access the contents in the content group.

7. The server apparatus of claim 5, wherein the content classifying unit classifies the contents stored in the content server according to a content price, an age of a user, or a content category.

* * * * *